United States Patent
Thurner (10) Patent No.: US 10,416,296 B2
(45) Date of Patent: Sep. 17, 2019

(54) 3DI SENSOR DEPTH CALIBRATION CONCEPT USING DIFFERENCE FREQUENCY APPROACH

(71) Applicant: Infineon Technologies AG, Neubiberg (DE)

(72) Inventor: Thomas Thurner, Graz (AT)

(73) Assignee: Infineon Technologies AG (DE)

(*) Notice: Subject to any disclaimer, the term of this patent is extended or adjusted under 35 U.S.C. 154(b) by 443 days.

(21) Appl. No.: 15/297,512

(22) Filed: Oct. 19, 2016

(65) Prior Publication Data
US 2018/0106891 A1    Apr. 19, 2018

(51) Int. Cl.
G01S 7/497    (2006.01)
G01S 17/89    (2006.01)
G01S 17/36    (2006.01)

(52) U.S. Cl.
CPC .............. *G01S 7/497* (2013.01); *G01S 17/36* (2013.01); *G01S 17/89* (2013.01)

(58) Field of Classification Search
CPC ........... G01S 7/497; G01S 17/36; G01S 17/89
USPC ........................................................ 356/5.01
See application file for complete search history.

(56) References Cited

PUBLICATIONS

Infineon Technologies AG, (2015), REAL3™ image sensor family: 3D depth sensing based on Time-of-Flight; pp. 1-2.

*Primary Examiner* — Daniel L Murphy
(74) *Attorney, Agent, or Firm* — Design IP (57) ABSTRACT

A three-dimensional image 3DI system includes a modulator configured to generate a first modulation signal and a second modulation signal having a predetermined frequency difference, an illumination source configured to generate a light signal modulated by the first modulation signal, and a sensor core including a pixel array modulated by the second modulation signal. At least one pixel of the pixel array is configured to receive a reflected modulated light signal and to demodulate the reflected modulated light signal using the second modulation signal during an image acquisition to generate a measurement signal. The at least one pixel is configured to generate a plurality of measurement signals based on a plurality of image acquisitions taken at different sample times. A controller is configured to receive the plurality of measurement signals, and calibrate the at least one pixel of the pixel array based on the plurality of measurement signals.

25 Claims, 4 Drawing Sheets

3DI SENSOR DEPTH CALIBRATION CONCEPT USING DIFFERENCE FREQUENCY APPROACH

FIELD

The present disclosure relates generally to devices and methods related to three-dimensional image (3DI) sensors, and, more particularly, to automated calibration procedures for calibration of Time-of-Flight (ToF) 3DI cameras and sensor chips.

BACKGROUND

Amplitude modulated continuous wave time-of-flight range cameras suffer from an inherent depth measurement error due to systematic error contributors, e.g. from so-called wiggling error for phase estimation with non-sinusoidal modulation signals. This is due to higher harmonics present in both signals which are not accounted for in the model or measurements. These and other systematic depth-dependent errors are generally corrected by employing a correction function based on frequency and depth dependent calibration data.

Thus, any three-dimensional image (3DI) sensor should be calibrated and corrected with thereby determined depth dependent correction values when used for depth measurement to account for existing systematic errors (e.g., wiggling errors). Currently this calibration has to be done for each final ToF camera or camera module by using an expensive and complicated calibration rig during an expensive and complicated calibration procedure.

For example, existing 3DI depth calibration is done by expensive and time consuming calibration system, with complicated procedure and sample handling. One way to achieve this calibration is by using a linear translation stage for manual calibration at defined distance steps between the ToF camera and a target plane.

The existing calibration procedure is not considered to be ideal due to time consuming depth calibration, complicated setup (also production and calibration of existing calibration setup) and complicated and time-consuming sample handling.

Therefore, an automated calibration procedure that simplifies the effort and reduces costs on the depth calibration for ToF 3DI cameras and sensor chips may be desired.

SUMMARY

Systems, devices and methods are provided for calibrating Time-of-Flight (ToF) three-dimensional image (3DI) cameras and sensors.

One or more embodiments provide a 3DI system that includes a modulator configured to generate a first modulation signal having a first modulation frequency and a second modulation signal having a second modulation frequency, the first and the second frequencies having a predetermined frequency difference, and an illumination source configured to generate a modulated light signal based on the first modulation signal. The 3DI system further includes a sensor core including a pixel array modulated by the second modulation signal. The at least one pixel of the pixel array is configured to receive the modulated light signal reflected from an object as a reflected modulated light signal and to demodulate the reflected modulated light signal using the second modulation signal during an image acquisition to generate a measurement signal, and the at least one pixel is further configured to generate a plurality of measurement signals based on a plurality of image acquisitions taken at different sample times. The 3DI system further includes a controller configured to receive the plurality of measurement signals, and calibrate the at least one pixel of the pixel array based on the plurality of measurement signals.

One or more embodiments provide a method of calibrating and correcting a pixel array of a three-dimensional image (3DI) module, the method including generating, by a modulator, a first modulation signal having a first modulation frequency and a second modulation signal having a second modulation frequency, the first and the second frequencies having a predetermined frequency difference; generating, by an illumination signal, a modulated light signal based on the first modulation signal; modulating, by the modulator, the pixel array according to the second modulation signal; receiving, by at least one pixel of the pixel array, the modulated light signal reflected from an object, where the modulated light signal reflected from the object is a reflected modulated light signal; demodulating the reflected modulated light signal using the second modulation signal during an image acquisition to generate a measurement signal; generating a plurality of measurement signals based on a plurality of image acquisitions taken at different sample times; and calibrating at least one pixel of the pixel array based on the plurality of measurement signals

BRIEF DESCRIPTION OF THE DRAWINGS

Embodiments are described herein making reference to the appended drawings.

DETAILED DESCRIPTION

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

Embodiments relate to sensors and sensor systems and to obtaining information about sensors and sensor systems. A sensor may refer to a component which converts a physical quantity to be measured to an electric signal, for example a current signal or a voltage signal. The physical quantity may, for example, comprise electromagnetic radiation, such as visible light, infrared (IR) radiation, or other type of illumination signal, a current, or a voltage, but is not limited thereto. As used herein, IR radiation may also be referred to as IR light.

A sensor device as used herein may refer to a device which comprises a sensor and further components, for example biasing circuitry, an analog-to-digital converter or a filter. A sensor device may be integrated on a single chip, although in other embodiments a plurality of chips or also components external to a chip may be used for implementing a sensor device.

Figure 1:
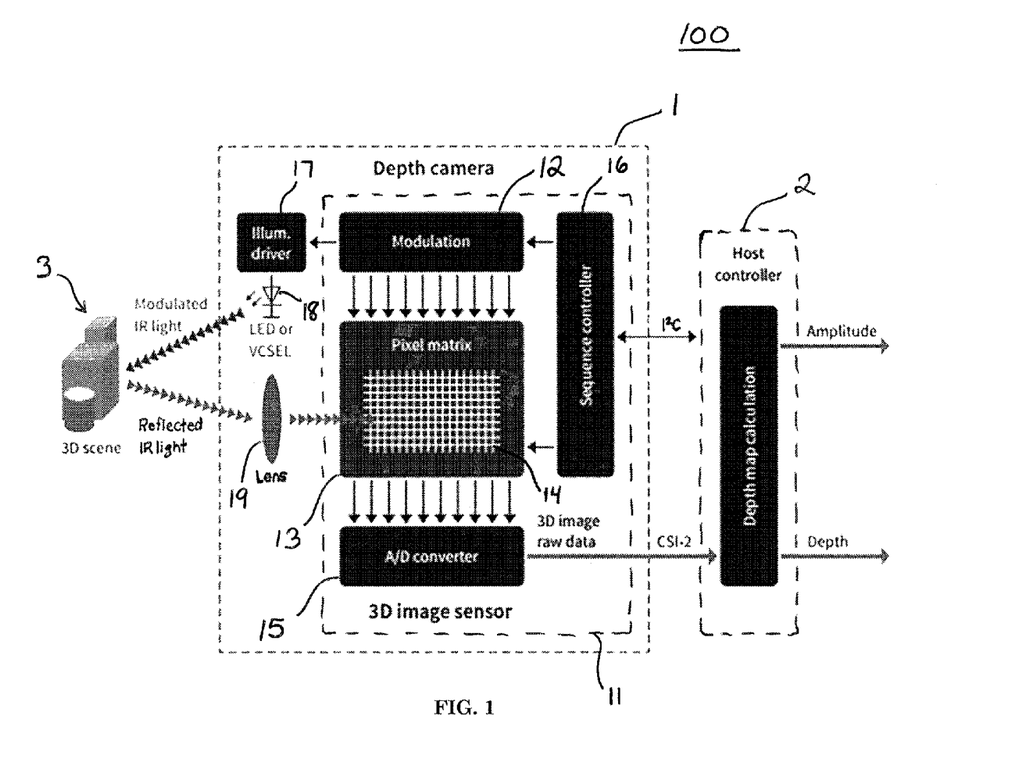
FIG. 1 illustrates a 3D image sensor system according to one or more embodiments.

FIG. 1 illustrates a three-dimensional (3D) image sensor system 100 according to one or more embodiments. The 3D image sensor system 100 includes a 3D depth camera 1, a host controller 2, and a 3D scene 3 made up of one or more objects. The 3D depth camera 1 is configured to emit modulated IR light and measures the time the IR signal takes to travel from the depth camera 1 to the 3D scene 3 and back again. The elapsed time, referred to as a "time-of-flight," enables the 3D depth camera 1 to generate image raw data on a pixel-by-pixel basis and output the image raw data to the host controller 2. In particular, the 3D depth camera 1 may be a continuous modulation ToF camera that measures the time-of-flight by estimating a phase difference between the reflected modulated light and the modulation signal generated by the sensor. The phase difference $\Delta\Phi$ is translated to the time-of-flight $\Delta t$ by incorporating the modulation frequency, $f_{mod}$: $\Delta\Phi=2\times pi\times f_{mod}\times\Delta t$, where $\Delta t$ represents a change in time.

The image sensor may include a phase shifter unit which enables additional well-defined phase differences or steps (time-delays) to be introduced between the illumination signal (and thus the modulated IR light) and the sensor core modulation signal, which may be used for calculating the full unambiguous phase difference and from that calculate the measured depth on a per pixel basis. A Camera Serial Interface 2 (CSI-2), for example, may be used to output the (digital) image raw data from the depth camera 1 to the host controller 2. The host controller 2 may include one or more processors, such as one or more central processing units (CPUs), digital signal processors (DSPs), general purpose microprocessors, application specific integrated circuits (ASICs), field programmable logic arrays (FPGAs), or other equivalent integrated or discrete logic circuitry.

Accordingly, the host controller 2 may be configured to receive the image raw data and perform a depth map calculation to determine an amplitude (i.e., the intensity of the received reflected modulated light) and depth (e.g., calculated from the estimated phase difference between the received reflected IR light and the sensor core modulation) for each pixel derived from the image raw data. For example, the host controller 2 may use four so-called phase images (e.g., four measurements) at 0/90/180/270° of well-defined additional phase difference introduced by the phase shifter unit to estimate the phase difference between the reflected modulated light and the sensor core modulation signal as used for calculation of the depth of an object per sensor pixel. The amplitude and depth are then output by the host controller 2 to generate an image that represents the 3D scene 3. The depth calculation by the controller 2 may be based on a determination of the absolute phase difference between the received reflected modulated light and the sensor modulation signal (i.e., the illumination modulation signal generated by the sensor).

Due to the ambiguity in phase information, any unambiguous phase estimation for a certain modulation frequency is connected to a certain so-called unambiguity range $\Delta z_{max}$ for the depth measurement, given by $\Delta z_{max}=\lambda_{mod}/2=(c/f_{mod})/2$ with $f_{mod}$ and $\lambda_{mod}$ being the modulation frequency and the modulation wavelength of the used illumination signal, and c is the speed of light of the given propagation medium (in most cases air). E.g. for a modulation frequency of 60 MHz the unambiguity range for depth measurement is given by $\Delta z_{max\_60}=5$ m/2=2.5 m. To obtain a larger unambiguous range multiple depth measurements for different modulation frequencies might be used, e.g. utilizing phase difference (or depth) estimations for $f_{mod}=60$ MHz and for $f_{mod}=80$ MHz to estimate depth over the extended unambiguity range of $\Delta z_{max\_60/80}=7.5$ m. The controller 2 may therefor utilize phase difference estimations (or depth estimations) from one or more modulation frequencies for deriving the final (combined) depth measurement over an extended unambiguity range.

In addition, the host controller 2 may perform calibration and correction procedures based on a sequence of image acquisitions (i.e., measurement acquisitions), as described below. Furthermore, while not shown in this example, the host controller 2 may be integrated on the 3D image sensor 11 in one or more embodiments. It will be appreciated that calibration, as used herein, may include correction, for example, correction of a calculated systematic depth error.

The depth camera 1 includes a 3D image sensor 11 that includes a modulator 12, a sensor core 13 having a pixel matrix 14 (i.e., pixel array), an analog-to-digital (A/D) converter 15, and a sequence controller 16 that communicates with the host controller 2 via an Inter-Integrated Circuit ($I^2C$) interface, for example.

The modulator 12 may include a phase shifter circuit which enables to include a pre-defined number of well-defined phase steps between the sensor core modulation signal and the illumination signal, e.g., of 0°/90°/180°/270°.

The sequence controller 16 may further control the modulation frequencies implemented by the modulator 12. The sequence controller 16 may be an internal controller logic with which the host controller 2 can communicate with the depth camera 1 or which the host controller 2 may parametrize the depth camera 1 in order to control one or more of the modulation and illumination frequencies, the additional pre-defined phase difference steps provided by the phase shifter, or the definition of an image sequence having defined frame rate.

The depth camera 1 further includes an illumination driver 17 and an illumination source 18, such as a light emitting diode (LED) or a vertical-cavity surface-emitting laser (VCSEL) configured to emit a modulated light signal (e.g., modulated IR light), and a lens 19. It will be appreciated that the terms "light signal", "IR light" and "illumination signal" may be used interchangeably herein.

The illumination source 18 is configured to emit the modulated IR light towards the 3D scene 3 using illumination optics (e.g., a lens or a diffractive optical element (DOE)). Thus, using the illumination optics, the illumination source 18 may illuminate only a field of view (FOV) of the image sensor 11.

The lens 19, which may be a imaging lens system or objective including one or more lenses or DOEs, is configured to receive reflected IR light that is reflected from objects of the 3D scene 3. The reflected light is directed by the lens 19 at the pixel matrix 14.

Each pixel of the pixel matrix 14 then generates analog image raw data, including at least one of amplitude information representing the reflected light intensity and depth measurement information representing phase information within reflected modulated light, based on the reflected light signal, and outputs the analog image raw data to the A/D converter 15 to be converted into digital image raw data. Thus, in order to obtain a 3D image, a sequence of a defined number of images may be obtained with a known, but different, arbitrary phase difference between the sensor core 13 modulation and the illumination signal (e.g., four phase steps at 0°/90°/180°/270°. The image acquisitions may be used to calculate the absolute phase difference between the reflected modulated light and the sensor core modulation signal, enabling the host controller 2 to calculate a depth (i.e., a distance between the sensor and the object in line-of-sight of each pixel) for each pixel of the pixel array 14. Image acquisitions from different modulation frequencies might be used to estimate depth information for an extended unambiguity range, where the phase difference estimation (thus depth measurement) may be calculated separately for each modulation frequency, and are then utilized for the extended range depth measurement (as described above).

The sensor core 13 may include one or more processors or control logic units, and is configured to sense and measure a time-of-flight of the light signal based on a phase difference measurement using the pixel matrix 14 as a sensor. In particular, each pixel is a sensor element configured to receive the reflected IR light signal and demodulate the reflected modulated light signal using a modulation signal provided to the sensor core 13. In order to ensure accurate sensing measurements, the modulator 12 is configured to define a frequency of the modulated IR light and to define the modulation frequency of the ToF sensor pixels of the pixel matrix 14 via control signals (e.g., modulation signals) received by the illumination driver 17 and the sensor core 13, respectively. As shown in FIG. 1, a plurality of modulation signals are received by the sensor core 13, each with a same modulation frequency, to control the modulation frequency of the ToF pixels of the pixel matrix 14.

The ToF pixel matrix 14 may be integrated together with mixed signal circuitry of the sensor 11 into a single chip by, for example, a complementary metal-oxide-semiconductor (CMOS) process.

During image sensing, the modulation frequency of ToF pixels on the sensor core 13 is synchronous to the modulation frequency of the illumination signal which defines the waveform of the active scene illumination, but may possibly include a known, defined arbitrary phase shift (e.g., introduced by a phase shifter circuit). Modulation frequencies may be in the range of 30 to 100 MHz, but are not limited to such.

In order to ensure the ToF pixels accurately measure a depth of an object, the pixels may be calibrated (or recalibrated) and corrected for depth-dependent systematic errors during a calibration process. Thus, a procedure for calibration of depth measurement capabilities and the determination of depth measurement correction values for ToF sensors is provided.

According to the depth calibration procedure, a small frequency difference is introduced for the modulation signals on sensor core 13 (e.g., for the ToF pixels) with respect to the modulation signal modulating the light source 18, e.g., a frequency difference in the range of 0.1 Hz to 100 Hz may be used but is not limited thereto. For example, a modulation frequency of the illumination signal may differ by 1 Hz compared to the modulation signals of the ToF pixels. After a period of time, $\Delta t$, two signals, for example, initially synchronized in phase but differing in frequency $\Delta f$ (in Hz) will develop a linearly with time changing total phase shift ($\Delta\Phi$). Accordingly, the phase difference between the two signals (in radians) after time $\Delta t$ is given by $\Delta\Phi=2\times pi\times\Delta f\Delta t$. Thus, the frequency difference $\Delta f$ leads to a well-defined phase shift or phase difference between the sensor core modulation and the illumination signal modulation linearly growing with time, dependent on the inverse of the frequency difference.

The phase shift between the sensor core modulation and the reflected illumination signal modulation may be detected by the sensor core 13 in terms of pixel-wise demodulation and generation of pixel raw data. This pixel raw data contains an unknown amplitude and phase offset due to unknown reflectivity of the measured object, distance dependency of reflected light intensity, and possible constant phase offset. To cope for the unknown amplitude and phase offset, multiple measurements (image acquisitions) with well-defined artificial phase differences (e.g., 4 phase steps at 0°/90°/180°/270°) are used to provide a means for calculating the phase difference over the full unambiguous phase range of $2\pi$ radians. From the phase difference the object distance (depth) may be calculated.

According to one or more embodiments, a full pixel-wise sensor response function can be acquired, which is the pixel-wise raw data over absolute phase difference or calculated distance if needed for each additional phase step as used for depth measurement in the 3DI application. Thus, the introduced linearly increasing (or decreasing) phase difference can be translated to a simulated, but highly accurate, evolution of object distance (depth), and for every sample time (i.e., a time of image acquisition with reference to a start time of modulation) the introduced artificial, but very accurate object distance, can be calculated based on the known frequency difference and the evolved time. Thus, a linearly increasing (or decreasing) phase shift introduces a linearly with time increasing (or decreasing) simulated additional object distance to the 3D scene 3. For example, a frequency difference of 0.1 Hz leads to the full 360° phase shift for a time duration of 10 seconds, covering the full possible phase difference range of the 3DI system. Thus, a linear sweep over full measurement range can be performed by the sensor core 13 within 10 seconds.

In view of the above, the 3DI system 100 includes a modulator 12 configured to generate a first modulation signal $f_{Illu}$ having a first modulation frequency and a second modulation signal $f_{mod}$ having a second modulation frequency, the first and the second frequencies having a predetermined frequency difference. The illumination source 18 is configured to generate a modulated light signal based on the first modulation signal. The sensor core 13 includes a pixel array 14 modulated by the second modulation signal, and at least one pixel of the pixel array is configured to receive the modulated light signal reflected from an object 3 as a reflected modulated light signal and to demodulate the reflected modulated light signal using the second modulation signal during an image acquisition to generate a measurement signal. The at least one pixel is configured to generate a plurality of measurement signals based on a plurality of image acquisitions taken at different sample times. The host controller 2 may be configured to receive the plurality of measurement signals, and calibrate the at least one pixel of the pixel array 14 based on the plurality of measurement signals.

The predetermined frequency difference introduces a linearly increasing phase difference between the reflected modulated light signal and the second modulation signal over a progression of the different sample times. Thus, each of the plurality of image acquisitions is taken at a different phase difference between the reflected modulated light signal and the second modulation signal. Further, each of the plurality of measurement signals includes information representative of a different phase difference between the reflected modulated light signal and the second modulation signal at a corresponding sample time.

The host controller 2 may be further configured to calculate at least one systematic depth measurement error based on the plurality of measurement signals, and calibrate the at least one pixel of the pixel array based on the at least one calculated systematic depth error.

The host controller 2 may be further configured to generate an actual sensor response function based on the plurality of measurement signals, and calculate the at least one systematic depth measurement error based on a comparison of the actual sensor response function to an expected sensor response function, where the at least one systematic depth measurement error is a function of distance. The actual sensor response function may include information representative of a behavior of a phase difference introduced by the predetermined frequency difference and the different sample times.

The host controller 2 may be further configured to generate at least one sensor response function for the at least one pixel based on the plurality of measurement signals as a function of a phase difference introduced by the predetermined frequency difference and the different sample times.

The host controller 2 may be further configured to compare the at least one sensor response function to an expected sensor response function, calculate at least one systematic depth measurement error based on at least one comparison result, and calibrate the at least one pixel of the pixel array based on the at least one calculated systematic depth error.

The host controller 2 may be further configured to generate at least one sensor response function for the at least one pixel based on the plurality of measurement signals as a function of a simulated distance introduced by the predetermined frequency difference and the different sample times.

The host controller 2 may be further configured to generate at least one sensor response function for the at least one pixel based on the plurality of measurement signals as a function of a simulated depth introduced by the predetermined frequency difference and the different sample times.

The host controller 2 may be further configured to generate at least one sensor response function based on the plurality of measurement signals such that a sensor response function is generated for each pixel of the at least one pixel.

The host controller 2 may be further configured to compare each of the at least one sensor response function to an expected sensor response function, calculate a systematic depth measurement error for each pixel of the at least one pixel based on each comparison result, and calibrate each pixel of the at least one pixel based on each calculated systematic depth error.

The host controller 2 may be further configured to generate an average sensor response function from the at least one sensor response function, and calibrate the at least one pixel based on the average sensor response function.

The host controller 2 may be further configured to compare the average sensor response function to an expected sensor response function, calculate a systematic depth measurement error based on a comparison result, and calibrate the at least one pixel based on the calculated systematic depth error.

The host controller 2 may be further configured to calculate at least one global correction value derived from the calculated at least one systematic depth measurement error, and calibrate the at least one pixel based on the global correction value. Each of the at least one sensor response function is a function of measurement signals, generated by a pixel of the at least one pixel, over one of a phase difference, a distance or a depth. The phase difference is a phase difference between the reflected modulated light signal and the second modulation signal $f_{mod}$. Each of the at least one sensor response functions may represent an evolution of a phase difference over one of a distance or a phase measurement range and the plurality of measurement signals may represent sample points of the actual sensor response function.

The host controller 2 may be further configured to calculate a simulated distance between the object and the sensor core based on a phase difference between the reflected modulated light signal and the second modulation signal.

The host controller 2 may be further configured to calculate the simulated distance based on the predetermined frequency difference and a predetermined distance between the sensor core and the object.

The modulator 12 may include a first phase-locked loop configured to control the first modulation frequency of the first modulation signal and a second phase-locked loop configured to control the second modulation frequency of the second modulation signal.

The modulator 12 may include a combined phase-locked loop structure configured to control the first modulation frequency of the first modulation signal and the second modulation frequency of the second modulation signal.

The modulator 12 may be configured to synchronously start the first modulation signal and the second modulation signal at a start of a sequence of the plurality of image acquisitions.

The sensor core 13 may be configured to perform the plurality of image acquisitions at constant time intervals over a 360° phase shift.

While not limited thereto, the predetermined frequency difference may be in a range of 0.1 Hz to 100 Hz, where the first modulation frequency is in a range of 30 MHz to 100 MHz.

The host controller 2 may be further configured to calibrate all pixels of the pixel array in parallel.

The modulator 12 may further include a phase shifter configured to shift a phase of one of the first modulation signal and the second modulation signal at a phase step for each of the plurality of image acquisitions.

A method of calibrating at least one pixel of a pixel array of a 3DI module may include generating a first modulation signal having a first modulation frequency and a second modulation signal having a second modulation frequency, the first and the second frequencies having a predetermined frequency difference; generating a modulated light signal based on the first modulation signal; modulating the pixel array according to the second modulation signal; receiving the modulated light signal reflected from an object, where the modulated light signal reflected from the object is a reflected modulated light signal; demodulating the reflected modulated light signal using the second modulation signal during an image acquisition to generate a measurement signal; generating a plurality of measurement signals based on a plurality of image acquisitions taken at different sample times; and calibrating at least one pixel of the pixel array based on the plurality of measurement signals.

The method may further include calculating at least one systematic depth measurement error based on the plurality of measurement signals; and calibrating the at least one pixel of the pixel array based on the at least one calculated systematic depth error.

The method may further include generating an actual sensor response function based on the plurality of measurement signals; and calculating the at least one systematic depth measurement error based on a comparison of the actual sensor response function to an expected sensor response function.

The method may further include generating at least one sensor response function for the at least one pixel based on the plurality of measurement signals as a function of a phase difference introduced by the predetermined frequency difference and the different sample times.

The method may further include comparing the at least one sensor response function to an expected sensor response function; calculating at least one systematic depth measurement error based on at least one comparison result; and calibrating the at least one pixel of the pixel array based on the at least one calculated systematic depth error.

The method may further include generating at least one sensor response function for the at least one pixel based on the plurality of measurement signals as a function of a simulated distance introduced by the predetermined frequency difference and the different sample times.

The method may further include generating at least one sensor response function for the at least one pixel based on the plurality of measurement signals as a function of a simulated depth introduced by the predetermined frequency difference and the different sample times.

The method may further include generating at least one sensor response function based on the plurality of measurement signals such that a sensor response function is generated for each pixel of the at least one pixel.

The method may further include comparing each of the at least one sensor response function to an expected sensor response function; calculating a systematic depth measurement error for each pixel of the at least one pixel based on each comparison result; and calibrating each pixel of the at least one pixel based on each calculated systematic depth error.

The method may further include generating an average sensor response function from the at least one sensor response function; and calibrating the at least one pixel based on the average sensor response function.

The method may further include comparing the average sensor response function to an expected sensor response function; calculating a systematic depth measurement error based on a comparison result; and calibrating the at least one pixel based on the calculated systematic depth error.

The method may further include calculating a global correction value derived from the calculated systematic depth measurement error; and calibrating the at least one pixel based on the global correction value.

Figure 2A:
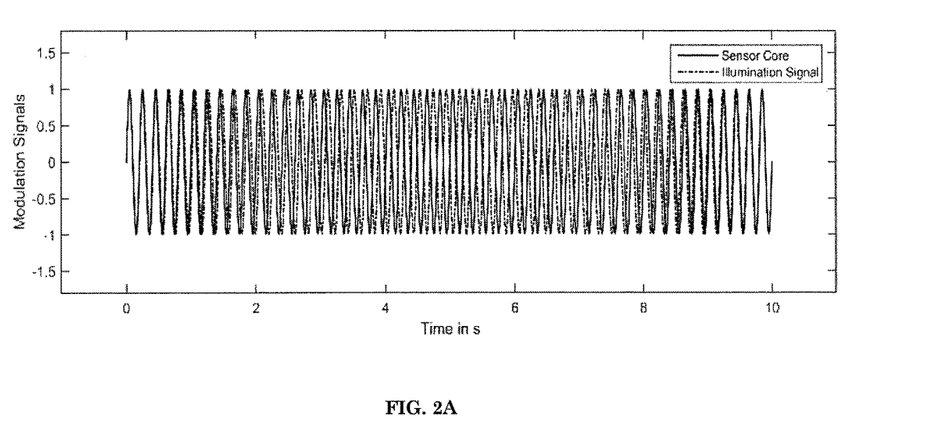
FIG. 2A shows a time plot of modulated sensor core and illumination signals having a frequency difference of 0.1 Hz over 10 seconds.

FIG. 2A shows an example time plot of modulated sensor core and illumination signals having a frequency difference of 0.1 Hz over 10 seconds. The time plot shows an evolution of the phase shift between the sensor core signal and the illumination core such that the signals are completely in phase (e.g., 0°) at 0 seconds, completely out of phase by 180° at 5 seconds, and back in phase (e.g., 360°) at 10 seconds. Thus, a linear sweep over full measurement range can be performed by the sensor core 13 within 10 seconds.

Figure 2B:
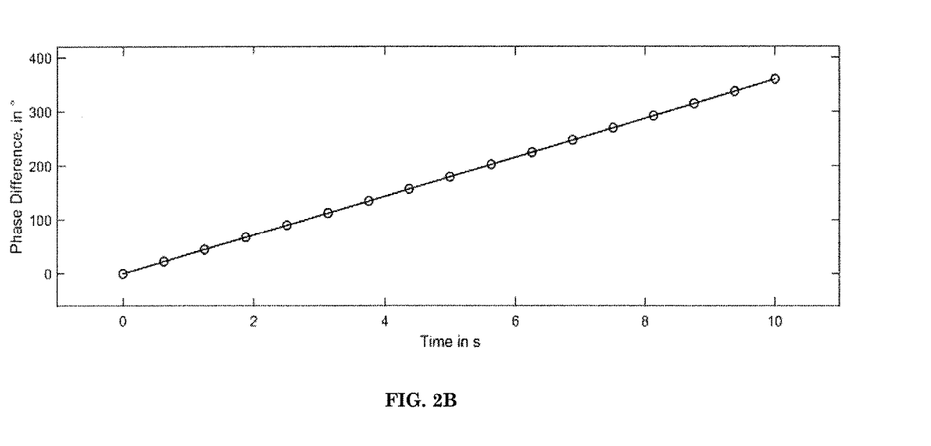
FIG. 2B shows a time plot of a linear increase of a phase difference between the modulated sensor core and illumination signals having a frequency difference of 0.1 Hz over 10 seconds.

FIG. 2B shows an example time plot of a linear increase of the phase difference between the modulated sensor core and illumination signals having a frequency difference of 0.1 Hz over 10 seconds. In particular, FIG. 2B shows sample points for all 10° phase difference steps using a frequency difference of 10% of the nominal frequency.

A start of both modulation signals (i.e., the sensor core signals and the illumination signal) may be selected to occur in a synchronous manner, though not necessarily required, and a frame rate (i.e., a time between 3DI image frame acquisitions) can be programmed arbitrarily. In the case the modulation signals are not initially synchronized, an additional 4-phase depth measurement may be used to obtain an initial phase difference when the object distance is known.

Thus, the full sensor response function (i.e., a sensor raw signal evolution over the full distance (depth) range, equivalent to the full range of phase difference between the reflected modulated light and the sensor modulation signal) can be acquired per pixel in a simple and automated way. For example, using the above calibration procedure, the sensor core 13 (e.g., the pixels of the pixel matrix 14) may be calibrated using depth information by taking measurements of a reference object (e.g., a flat wall or plane surface) in a "point-and-shoot" procedure using the depth camera 10. The frequency difference may be a predetermined value set for the calibration procedure. A distance of the reference object may be predetermined or may be input by a user such that the known distance can be used to calibrate the pixels of the pixel matrix 14. The frequency difference may also be adjusted by a user, as long as the frequency difference is known to the calibration system when performing calibration measurements and calculations.

Depth calibration may then be achieved for each used modulation frequency by targeting the active modulated illumination and the field of view of the sensor onto a flat surface (e.g., a white wall) and simulating the depth distance in the way described above over the full range of phase difference 0-360° (or even more). Thus, the full depth range of the sensor can be covered by the calibration procedure. This calibration can then be done for all pixels on the sensor core 13 in parallel, further enabling a full sensor array depth calibration. Also, additional pre-defined phase steps introduced by a phase shifter unit may be incorporated in the above described calibration procedure (e.g., obtaining sensor response functions for each additional pre-defined phase step), but may not be necessary. A distance of the reference object may be selected as any distance, as long as the distance is known in advance of performing the depth distance simulation for calibration. Based on acquired sensor signals and calculated phase shift information, depth information can be calculated and compared to the known distance information. Based on the distance comparison, the pixels can be calibrated. Therefore, small calibration setups are possible with much more precise calibration results.

The procedure may also allow the sensor core 13 to be recalibrated at any time in the field. For example, a recalibration procedure may be initiated by user input (e.g., a push of a button) and pointing the 3DI camera at a reference object (e.g., a planar surface at a known distance). Upon initializing the calibration procedure, a frequency difference between the modulated signals can be automatically imposed to acquire the full sensor response function of the ToF camera for all used modulation frequency values, which enables the determination of systematic depth measurement errors and, thus, depth dependent correction values. The systematic depth measurement errors can be determined by comparing the acquired sensor response function with an ideal or expected sensor response function (e.g., a purely sinusoidal function for the 4-point depth measurement algorithm, or other multipoint depth measurement algorithm). Alternatively, the systematic depth measurement errors can be determined by comparing depth measurements from the obtained sensor response function with the calculated, but very accurately given, simulated object distance (depth) from the 2-frequency approach (either from sensor response functions for all pre-defined additional phase steps as needed by the depth calculation, or by using all available phase differences from the full sensor response function, which might be sampled in a way to also obtain the pre-defined additional phase steps). Based on the obtained systematic depth measurement error contributions, the depth measurement per pixel can be calibrated and then corrected for each 3DI depth measurement.

Embodiments described above are described in further detail below. The modulator 12 may include two phase lock loops (PLLs) and a phase shifter integrated on one or more chips of the image sensor 11. A first PLL is configured to provide modulation signals via a first modulation path to the sensor core 13 and a second PLL is configured to provide modulation signals via a second modulation path to the illumination driver 17 for modulation of the illumination output of the illumination source 18. For depth calibration, the PLLs may be programmed such that they differ slightly in frequency (e.g., a difference of 0.1-100 Hz for a nominal modulation frequency of 80 MHz). Both the first and the second PLLs are derived from the same system clock frequency, which means they are synchronous and can keep even tiny frequency differences constant. It will be appreciated that, while the use of two PLLs are described, other equivalent structures are also possible. For example, structures with a combined PLL or modulator structure may be implemented where the two different frequencies can be obtained.

Under normal operation (i.e., a non-calibration operation) of the 3DI sensor system 100, during which full 3D information is acquired from an imaged environment, a first one of the two PLLs may be used to generate both modulation signals at the same frequency, while the second one of the two PLLs may be used for generating the CSI-2 clock for data transmission to the host controller 2. However, for performing depth calibration, the PLL used for generating the CSI-2 clock may be configured via unique register settings in the sensor 11 to modulate one of the sensor core or the illumination signal while the other PLL modulates the other one of the sensor core or the illumination signal. In other implementations, functional blocks may be configured such that the PLL used for generating the CSI-2 clock is configured to modulate one of the sensor core or the illumination signal. Thus, the two PLLs can be used during depth calibration to set the frequencies of the modulation signals in the modulation paths having a frequency difference. It will be appreciated that other implementations (e.g., independent of the CSI-2 PLL) may be realized using two or more PLLs or a single PLL having a combined PLL structure, as long as a frequency difference in the modulation paths is realized.

In addition, the phase shifter may be provided for depth calibration and may be included in the sensor core modulation path or in the illumination signal modulation path (i.e., in the first modulation path or the second modulation path) for introducing arbitrary phase steps that are substantially equally distributed within the full angle of 360° (e.g., 0°/90°/180°/270°). A sequence of raw images is obtained using the arbitrary phase steps, where each contains distance information. Due to an unknown offset and gain in the pixel raw signals, as a result of an unknown reflected light intensity and phase (i.e., unknown target reflectivity and distance), at least three independent measurements are used for estimation of the phase difference between the sensor pixel modulation and the returning light. The phase difference has a systematic offset for all pixels (i.e., a per pixel fixed pattern phase noise (FPPN)) due to systematic time delays in the illumination signal and the per pixel modulation signals, and can be directly calculated into a distance (depth) for the unambiguous phase/distance range by knowing the modulation frequency and the speed of light.

The two PLLs may be synchronously started, though not necessarily required as previously described, such that the modulated illumination signal and the modulated sensor signal start at an initial phase difference of 0°. After initialization, the phase difference between the modulated signals grows at a constant growing phase difference, introducing a linear phase shift that grows linearly with time. In principal, phase differences of greater than 360° can be used (phase ambiguity). Programming a certain frame rate, integration time, and wait times, arbitrarily but precise and well known phase differences can be selected for arbitrary sampling of the sensor response function of the camera device, as needed for calibration. This may lead to precise calibration results.

Calibration may then be performed at a reference object (e.g., a simple, flat surface) at known distance from the sensor 11 (e.g., 0.2 m or 0.5 m) running through arbitrarily chosen phase differences with possibly constant phase steps between different measurement samples. That is, the increase in phase shift between regularly occurring samples may be expected to be constant. Thus, calibration data may be generated by the host controller 2 based on the expected high accuracy of the introduced artificial phase difference and, thus, the object distance (depth) steps.

A frame rate may also be arbitrary (i.e., not constant in time), as long as the time difference between each image acquisition, which will be the simulated phase or distance difference, is known.

Thus, the calibration procedure may reduce calibration effort for time-of-flight cameras at the manufacturer or in the field, leading to lower system costs. By using the proposed two-frequency calibration method, with simple geometrical setup, full sensor array calibration of all pixels may be achieved in parallel in a single calibration step. Furthermore, the calibration procedure may be performed by an automated routine (e.g., for image acquisition and calculation of calibration data). Thus, a simple depth calibration can be achieved using constantly growing phase difference that provides a constant growing simulated depth by introducing a frequency shift between a sensor modulation signal and illumination modulation signal. The precise and simple setup may be used inside sensor or camera production processes or in the field by the end user.

Figure 3:
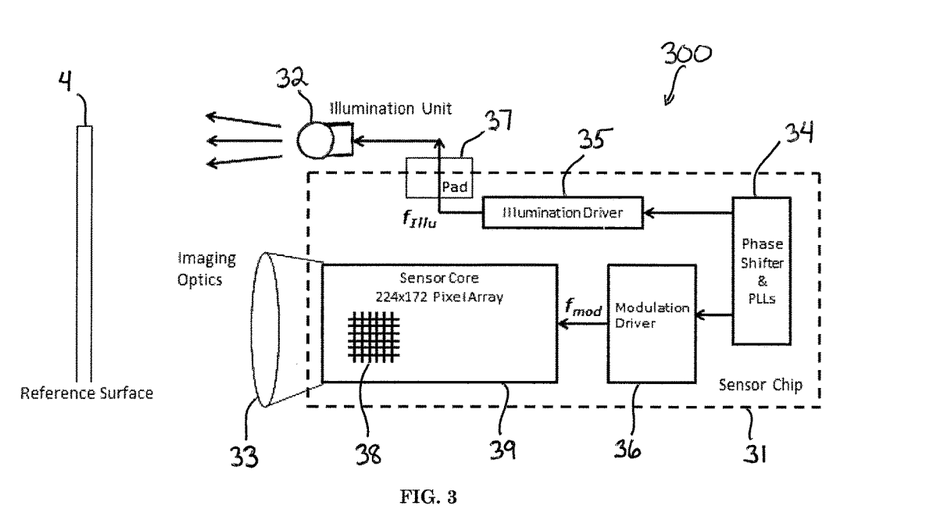
FIG. 3 illustrates a 3D image sensor according to one or more embodiments.

FIG. 3 illustrates a 3D image sensor 300 according to one or more embodiments. The 3D image sensor 300 includes a sensor chip 31, an illumination unit 32, and imaging optics 33 (e.g., a lens). The illumination unit 32 may be an LED, VCSEL, or any other suitable light source configured to emit a modulated illumination signal (e.g., modulated IR light or light signal). The illumination unit 32 may be configured to emit the modulated IR light towards a reference surface 4, and the lens 19 may be configured to receive reflected modulated IR light that is reflected from the reference surface 4.

The sensor chip 31 includes a phase shifter and PLL circuit 34 electrically connected to an illumination driver 35 and a modulation driver 36. The phase shifter and PLL circuit 34 may include a phase shifter and two PLLs that share a same system clock. Alternatively, structures with a combined PLL structure may be implemented where the two different frequencies can be obtained.

The function of the phase shifter and PLL circuit 34 is similar to the function of the modulator 12 described above. For example, the phase shifter may be configured to control a phase offset between the sensor core modulation and the illumination signal by introducing a phase shift in one of the modulation paths (i.e., in one of the sensor core modulation path or in the illumination signal modulation path). Consequently, the phase shifter may control a phase shift or phase offset of the modulated signals, as required by a depth measurement algorithm previously described. In addition, a first PLL may be configured to control a modulation signal $f_{Illu}$ via the illumination driver 35 and a second PLL may be configured control a modulation signal $f_{mod}$ via the modulation driver 36. The phase shifter introduces arbitrary but well-defined phase differences or steps, e.g., 0°/90°/180°/270°, for consecutive image acquisitions that are utilized for the depth estimation. In principle, at least three image acquisitions with different suitable phase steps are used for depth measurements, and more particularly, four or more image acquisitions are used.

During depth calibration, the illumination driver 35 may be configured to receive a first control signal from the first PLL, possibly phase shifted by the phase shifter, and output the modulation signal $f_{Illu}$ to the illumination unit 32 via pad 37 according to the first control signal. The pad 37 may be, for example, a single-ended (SE) or differential pad that electrically connects the illumination driver 35 to the illumination unit 32.

During depth calibration, the modulation driver 36 may be configured to receive a second control signal from the second PLL, possibly phase shifted by the phase shifter, and output the modulation signal $f_{mod}$ to a pixel array 38 of a sensor core 39 according to the second control signal.

The pixel array 38 may be a 224×172 pixel array, but is not limited thereto. The pixel array 38 may be configured to receive the reflected IR signal from the imaging optics 33 and demodulate the reflected IR signal using the modulation signal $f_{mod}$ such that a phase shift between the modulated (reflected) illumination signal and the modulated pixel array 38 (e.g., signal $f_{mod}$) may be detected and measured. In particular, the pixel array 38 may be configured to directly demodulate the reflected light.

Upon demodulating the reflected light, the sensor core 39 may obtain phase shift information between the modulated sensor core signal and the modulated (reflected) illumination signal to be used for calibration by either a host controller (not shown) or by the sensor core 39. For example, the calibration may take place at a host controller (see e.g., FIG. 1) by incorporating the acquired images which have been sent to the host controller by a digital interface bus (e.g. CSI-2). For more integrated cameras, the sensor chip 31 may be configured to perform the calibration steps. In this case, a separate controller and memory inside the sensor chip 31 may be included to perform the calibration. For example, the host controller 2 shown in FIG. 1 may be integrated on the sensor chip 31. It will be appreciated that the host controller (e.g., host controller 2 in FIG. 1) or the sensor chip 31 having an integrated controller, depending on implementation, may generally be referred to as a "calibration unit" or a "calibration controller" when referring to performing the calibration operations described herein.

Turning to the calibration, the further the distance of the reference surface 4 from the 3D image sensor 300 (i.e., the longer the time-of-flight), the greater the phase difference will be between modulated sensor core signal (e.g., signal $f_{mod}$) and the reflected modulated illumination signal. Since the additional phase difference between the illumination signal and the sensor core modulation increases linearly over time (i.e., representative of a distance), the measured sensor response function (i.e., the sensor response values measured over the full unambiguous phase difference range, or the connected depth measurement range) may be compared with an expected ideal sensor response function (e.g., a purely sinusoidal function over phase difference or distance), taking into account a predetermined phase difference or depth offset from the given distance to the object reference surface, where the given distance is provided by user input.

The comparison results (e.g., a comparison difference) may then be used by the calibration unit to perform depth calibration and correction on the pixel array 38 based on calculated depth dependent correction values that are calculated from all acquired calibration sensor images that represent a full sensor response function. A per pixel correction based on pixel-wise determination of the systematic errors and from that pixel-wise correction values will lead to improved performance and accuracy on the depth measurements. Thus, it will be appreciated that correction is possible on a pixel-by-pixel basis, which provides the highest accuracy, but also requires the highest amount of correction data and computation. During the production calibration of the 3D image sensor 300, pixel-based calibration can also be used to verify full functionality of the camera on a per pixel basis with full range depth measurement. Alternatively, in one or more examples, a single general global depth measurement error correction may be performed in parallel for all pixels by global depth-dependent correction values, assuming all pixels behave similarly. For example, a depth dependent global correction function obtained by averaging the systematic error for each depth value over the full pixel array, for each simulated distance and may be used to calculate the depth correction values for each measured depth value.

In addition, the calibration unit may be configured to receive the frequency difference (i.e., the frequency difference used to program the PLLs) and the expected distance of the reference surface 4 from the 3D image sensor 300 via user input in order to perform the calculation of the depth dependent correction values for compensating the existing systematic depth measurement error, and may include one or more processors for performing the calculations.

The sensor core 39 may be further configured to implement a four point depth measurement algorithm, such that four phase measurements are performed with four known phase shifts (e.g., shifted by 90° from each other by the phase shifter and PLL circuit 34 controlled by a sequence controller) which allows the sensor core 39 to estimate depth over the full unambiguous measurement range of the sensor for the given modulation frequency.

The sensor core 39 may also be configured for using two (or more) four-point depth measurements at different modulation frequencies (e.g., 60 MHz and 80 MHz) in order to extend the unambiguity range of the ToF camera. In this case the unambiguity range is given by the inverse of the frequency difference between the two different modulation frequencies. Here, 4-point depth measurements for each single modulation frequency are performed and the results of each measurement are combined to calculate distance at an extended measurement range.

The sensor core 39 may be configured with an integration time (i.e., the opening of the sensor pixels) of the reflected light signal may be in the range of 0.1-10 ms, but is not limited to this range. The sensor core 39 may be configured with a sample time (i.e., a time between different measurement samples) to make samples of the reflected light signal at constant (each 0.1 second or each 1.0 second) or arbitrary frame rate (i.e., time instances) to set up a linearly increasing additional phase difference for each pixel due to the introduced frequency difference between the illumination signal and the sensor core modulation. The introduced frequency difference leads to an artificial distance evolution, which is estimated from the sensor readings (i.e., measurement signals) and is provided as a sensor response function. According to the time difference between the individual image samples, an expected (linearly increased) phase difference, i.e., artificial depth, is known based on the known frequency difference, and can be compared to a depth measurement calculated from the sensor response function obtained by the pixel readouts of the pixel array 38. Thus, the time difference between individual image acquisitions is coded to the phase difference (or depth difference) of the sample points of the obtained sensor response function for use in the calibration process.

According to the samples, a systematic depth measurement error component (e.g., a wiggling error) for each pixel may be calculated based on the expected ideal sensor response function and the (linearly spaced) sample points of the acquired sensor response function. Thus, the comparison results (e.g., a comparison difference) are used to calculate correction values for each pixel or for the full pixel array 38 and eliminate the systematic depth error.

In addition, the above techniques may be used to perform first and second calibration steps. For example, the first calibration step may a determination of fixed pattern phase noise (FPPN) and may include a determination of possible systematic phase differences (time delays) between individual pixels in the pixel array 38, in addition to the average delay (i.e., distance offset), due to different modulation signal delays for the illumination signal and the sensor core modulation signal, for example, within the pixel array 38. The determination of FPPN may be accomplished by performing, for example, a 4-phase depth measurement on a flat surface at a known distance using the camera calibration, and is also needed to be a first step in the proposed depth calibration procedure—but using the same calibration setup. In this case the 4-phase depth measurement may be corrected after the depth calibration process by the obtained correction factors. The second calibration step may be a distance calibration for determining correction parameters for allowing compensation of systematic distance measurement errors, such as depth calibration described above.

Additionally, the FPPN may also be obtained from the acquired sensor response functions during the two-frequency calibration step, if the sensor response functions are evaluated for determination of the existing phase offset on a per-pixel-basis, based on the known (by user input) distance of the object reference plane used for calibration.

In addition, the initial phase relationship of the two modulation signals $f_{Illu}$ and $f_{mod}$ may be determined by the FPPN calibration step using a multi-phase depth measurement at planar surface (e.g., a 4-phase depth estimation sequence).

Figure 4:
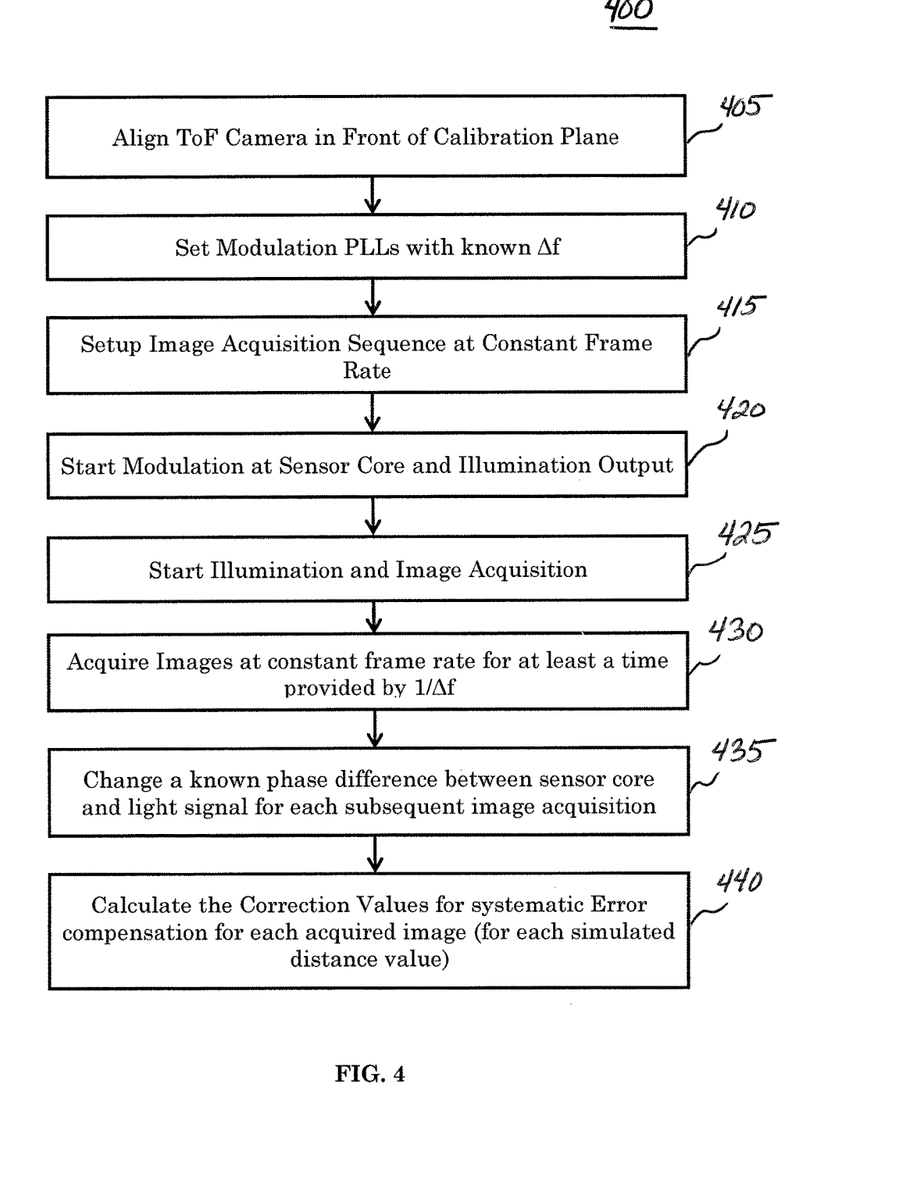
FIG. 4 illustrates a flow diagram of a calibration operation according to one or more embodiments.

FIG. 4 illustrates a flow diagram of a calibration operation 400 according to one or more embodiments. In particular, the calibration operation 400 relates to calibrating a pixel array of an image senor, and may be used to remove systematic depth measurement errors (e.g., wiggling error) from the pixels. While the flow diagram depicts a series of sequential operations, unless explicitly stated, no inference should be drawn from that sequence regarding specific order of performance, performance of operations or portions thereof serially rather than concurrently or in an overlapping manner, or performance of the operations depicted exclusively without the occurrence of intervening or intermediate operations. The process depicted in the example is implemented by, for example, one or more time-of-flight sensor systems described above.

The calibration operation 400 includes align ToF camera in front of a calibration plane or reference plane (operation 405), where the calibration plane is preferably a uniform, homogeneous high reflectivity planar surface at a known distance, oriented orthogonal to the line-of-sight of the ToF camera; set up the sensor, including set up the modulation PLLs with a known frequency offset Δf (operation 410) and set up an image acquisition sequence at a constant frame rate (operation 415); start modulation at a sensor core and at an illumination output (operation 420); start illumination and image acquisition (operation 425); acquire images at a constant frame rate for at least a time provided by 1/Δf (operation 430); change (e.g., increase) a phase difference between the sensor core and the light signal by a known phase difference step for each subsequent image acquisition (operation 435), where the known phase difference represents a simulated distance value; acquire samples of the full sensor response function of the camera and calculate correction values for systematic error compensation for each simulated distance value (operation 440).

Calculating the correction values may, for example, include calculating an error in the measured sensor response function (or in the per-pixel phase difference measurements from the expected phase difference for each image sample acquisition) to calculate the systematic depth measurement error based on a comparison result.

FPPN calibration can be done within the described calibration process by evaluating the phase offset of the individual per pixel sensor response functions, incorporating information on the calibration plane distance.

In addition, prior to depth calibration, FPPN calibration can also be performed using similar operations described in FIG. 4, including setting up the sensor with PLL frequencies, phase shifter settings, since this FPPN determination uses a 4-point depth measurement process, and frame rate, starting illumination and an image capturing sequence, calculating FPPN correction values from the consecutively acquired sensor readings, and storing calibration values for each pixel, or if applicable, for the full pixel array. Storage may be done in memory on the sensor, the camera or the host controller.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

Depending on certain implementation requirements, embodiments provided herein can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The above described exemplary embodiments are merely illustrative. It is understood that modifications and variations of the arrangements and the details described herein will be apparent to others skilled in the art. It is the intent, therefore, to be limited only by the scope of the pending patent claims and not by the specific details presented by way of description and explanation of the embodiments herein.

What is claimed is:

1. A three-dimensional image (3DI) system comprising:
   a modulator configured to generate a first modulation signal having a first modulation frequency and a second modulation signal having a second modulation frequency, the first and the second frequencies having a predetermined frequency difference;
   an illumination source configured to generate a modulated light signal based on the first modulation signal;
   a sensor core including a pixel array modulated by the second modulation signal, wherein at least one pixel of the pixel array is configured to receive the modulated light signal reflected from an object as a reflected modulated light signal and to demodulate the reflected modulated light signal using the second modulation signal during an image acquisition to generate a measurement signal, wherein the at least one pixel is configured to generate a plurality of measurement signals based on a plurality of image acquisitions taken at different sample times; and
   a controller configured to receive the plurality of measurement signals, and calibrate the at least one pixel of the pixel array based on the plurality of measurement signals.

2. The 3DI system of claim 1, wherein the controller is configured to calculate at least one systematic depth measurement error based on the plurality of measurement signals, and calibrate the at least one pixel of the pixel array based on the at least one calculated systematic depth error.

3. The 3DI system of claim 2, wherein the controller is configured to generate an actual sensor response function based on the plurality of measurement signals, and calculate the at least one systematic depth measurement error based on a comparison of the actual sensor response function to an expected sensor response function.

4. The 3DI system of claim 3, wherein the actual sensor response function includes information representative of a behavior of a phase difference introduced by the predetermined frequency difference and the different sample times, and the phase difference is a phase difference between the reflected modulated light signal and the second modulation signal.

5. The 3DI system of claim 1, wherein the controller is configured to generate at least one sensor response function for the at least one pixel based on the plurality of measurement signals as a function of a phase difference introduced by the predetermined frequency difference and the different sample times.

6. The 3DI system of claim 5, wherein the controller is configured to compare the at least one sensor response function to an expected sensor response function, calculate at least one systematic depth measurement error based on at least one comparison result, and calibrate the at least one pixel of the pixel array based on the at least one calculated systematic depth error.

7. The 3DI system of claim 1, wherein the controller is configured to generate at least one sensor response function for the at least one pixel based on the plurality of measurement signals as a function of a simulated distance introduced by the predetermined frequency difference and the different sample times.

8. The 3DI system of claim 1, wherein the controller is configured to generate at least one sensor response function for the at least one pixel based on the plurality of measurement signals as a function of a simulated depth introduced by the predetermined frequency difference and the different sample times.

9. The 3DI system of claim 1, wherein the controller is configured to generate at least one sensor response function based on the plurality of measurement signals such that a sensor response function is generated for each pixel of the at least one pixel.

10. The 3DI system of claim 9, wherein the controller is configured to compare each of the at least one sensor response function to an expected sensor response function, calculate a systematic depth measurement error for each pixel of the at least one pixel based on each comparison result, and calibrate each pixel of the at least one pixel based on each calculated systematic depth error.

11. The 3DI system of claim 9, wherein the controller is configured to generate an average sensor response function from the at least one sensor response function, and calibrate the at least one pixel based on the average sensor response function.

12. The 3DI system of claim 11, wherein the controller is configured to compare the average sensor response function to an expected sensor response function, calculate a systematic depth measurement error based on a comparison result, and calibrate the at least one pixel based on the calculated systematic depth error.

13. The 3DI system of claim 12, wherein the controller is configured to calculate at least one global correction value derived from the calculated at least one systematic depth measurement error, and calibrate the at least one pixel based on the global correction value.

14. The 3DI system of claim 1, wherein the predetermined frequency difference introduces a linearly increasing phase difference between the reflected modulated light signal and the second modulation signal over a progression of the different sample times.

15. The 3DI system of claim 1, wherein each of the plurality of measurement signals includes information representative of a different phase difference between the reflected modulated light signal and the second modulation signal at a corresponding sample time.

16. A method of calibrating at least one pixel of a pixel array of a three-dimensional image (3DI) module, the method comprising:
generating a first modulation signal having a first modulation frequency and a second modulation signal having a second modulation frequency, the first and the second frequencies having a predetermined frequency difference;
generating a modulated light signal based on the first modulation signal;
modulating the pixel array according to the second modulation signal;
receiving the modulated light signal reflected from an object, wherein the modulated light signal reflected from the object is a reflected modulated light signal;
demodulating the reflected modulated light signal using the second modulation signal during an image acquisition to generate a measurement signal;
generating a plurality of measurement signals based on a plurality of image acquisitions taken at different sample times; and
calibrating at least one pixel of the pixel array based on the plurality of measurement signals.

17. The method of claim 16, further comprising:
calculating at least one systematic depth measurement error based on the plurality of measurement signals; and
calibrating the at least one pixel of the pixel array based on the at least one calculated systematic depth error.

18. The method of claim 17, further comprising:
generating an actual sensor response function based on the plurality of measurement signals; and
calculating the at least one systematic depth measurement error based on a comparison of the actual sensor response function to an expected sensor response function.

19. The method of claim 16, further comprising:
generating at least one sensor response function for the at least one pixel based on the plurality of measurement signals as a function of one of a phase difference introduced by the predetermined frequency difference and the different sample times, a simulated distance introduced by the predetermined frequency difference and the different sample times, or a simulated depth introduced by the predetermined frequency difference and the different sample times.

20. The method of claim 19, further comprising:
comparing the at least one sensor response function to an expected sensor response function;
calculating at least one systematic depth measurement error based on at least one comparison result; and
calibrating the at least one pixel of the pixel array based on the at least one calculated systematic depth error.

21. The method of claim 16, further comprising:
generating at least one sensor response function based on the plurality of measurement signals such that a sensor response function is generated for each pixel of the at least one pixel.

22. The method of claim 21, further comprising:
comparing each of the at least one sensor response function to an expected sensor response function;
calculating a systematic depth measurement error for each pixel of the at least one pixel based on each comparison result; and
calibrating each pixel of the at least one pixel based on each calculated systematic depth error.

23. The method of claim 21, further comprising:
generating an average sensor response function from the at least one sensor response function; and
calibrating the at least one pixel based on the average sensor response function.

24. The method of claim 23, further comprising:
comparing the average sensor response function to an expected sensor response function;
calculating a systematic depth measurement error based on a comparison result; and
calibrating the at least one pixel based on the calculated systematic depth error.

25. The method of claim 24, further comprising:
calculating a global correction value derived from the calculated systematic depth measurement error; and
calibrate the at least one pixel based on the global correction value.

* * * * *